(12) United States Patent
Obradovich et al.

(10) Patent No.: US 7,319,848 B2
(45) Date of Patent: *Jan. 15, 2008

(54) TECHNIQUE FOR COLLECTING DATA FROM VEHICLES FOR ANALYSIS THEREOF

(75) Inventors: Michael L. Obradovich, San Clemente, CA (US); Philip E. White, Laguna Niguel, CA (US)

(73) Assignee: American Calcar Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/280,048

(22) Filed: Nov. 15, 2005

(65) Prior Publication Data

US 2006/0079252 A1   Apr. 13, 2006

Related U.S. Application Data

(63) Continuation of application No. 10/840,170, filed on May 5, 2004, now Pat. No. 6,987,964, which is a continuation of application No. 09/622,869, filed as application No. PCT/US99/28848 on Dec. 6, 1999, now Pat. No. 6,754,485.

(60) Provisional application No. 60/117,958, filed on Jan. 28, 1999, provisional application No. 60/113,397, filed on Dec. 23, 1998.

(51) Int. Cl.
H04B 1/034 (2006.01)

(52) U.S. Cl. ............... 455/99; 455/345; 455/414.1; 455/557; 701/29; 701/32; 701/36; 340/425.5; 340/438; 340/439; 340/539.1; 340/539.24; 340/853.2

(58) Field of Classification Search .......... 455/96, 455/99, 345, 414.1, 414.2, 422, 426, 466, 455/507, 556, 557, 412.1, 412.2; 340/7.52, 340/7.31, 7.35, 286.14, 425.5, 426.1, 438, 340/457, 825.72, 825.52, 426.28, 426.29, 340/539.16, 998, 539.1, 539.24, 853.2; 701/24, 701/29, 36, 30, 32
See application file for complete search history.

(56) References Cited

U.S. PATENT DOCUMENTS

| | | |
|---|---|---|
| 4,928,099 A | 5/1990 | Drake |
| 5,072,380 A | 12/1991 | Randelman et al. |
| 5,095,532 A | 3/1992 | Mardus |
| 5,218,629 A | 6/1993 | Dumond, Jr. et al. |
| 5,400,018 A | 3/1995 | Scholl et al. |
| 5,442,553 A | 8/1995 | Parillo |
| 5,471,393 A | 11/1995 | Bolger |
| 5,479,157 A | 12/1995 | Suman et al. |
| 5,504,482 A | 4/1996 | Schreder |
| 5,642,284 A * | 6/1997 | Parupalli et al. ............. 701/30 |
| 5,717,387 A | 2/1998 | Suman et al. |
| 5,732,074 A * | 3/1998 | Spaur et al. ................ 370/313 |
| 5,786,998 A | 7/1998 | Neeson et al. |
| 5,818,356 A | 10/1998 | Schuessler |
| 5,825,283 A | 10/1998 | Camhi |
| 5,832,394 A | 11/1998 | Wortham |
| 5,844,473 A * | 12/1998 | Kaman ...................... 340/439 |
| 5,928,291 A * | 7/1999 | Jenkins et al. ................ 701/1 |
| 5,931,878 A | 8/1999 | Chapin, Jr. |
| 5,963,129 A | 10/1999 | Warner |
| 5,973,619 A | 10/1999 | Paredes |
| 5,991,690 A | 11/1999 | Murphy |
| 6,018,657 A | 1/2000 | Kennedy, III et al. |
| 6,028,537 A | 2/2000 | Suman et al. |
| 6,061,614 A * | 5/2000 | Carrender et al. ............ 701/33 |
| 6,070,155 A * | 5/2000 | Cherrington et al. ....... 705/400 |
| 6,112,152 A * | 8/2000 | Tuttle ........................ 701/115 |
| 6,114,970 A | 9/2000 | Kirson et al. |
| 6,210,210 B1 | 4/2001 | Kozel et al. |
| 6,236,337 B1 | 5/2001 | Beier et al. |
| 6,240,365 B1 | 5/2001 | Bunn |
| 6,275,147 B1 | 8/2001 | Flick |
| 6,275,231 B1 | 8/2001 | Obradovich |
| 6,333,687 B1 | 12/2001 | LaBelle |
| 6,405,033 B1 | 6/2002 | Kennedy, III et al. |

| | | |
|---|---|---|
| 6,427,101 B1 | 7/2002 | Diaz et al. |
| 6,580,914 B1 | 6/2003 | Smith |
| 6,598,016 B1 | 7/2003 | Zavoli et al. |
| 6,611,201 B1 | 8/2003 | Bishop et al. |
| 6,754,485 B1 | 6/2004 | Obradovich et al. |
| 2001/0044310 A1 | 11/2001 | Lincke |

FOREIGN PATENT DOCUMENTS

| | | |
|---|---|---|
| EP | 0 756 153 A2 | 1/1997 |
| JP | 04-261576 | 9/1992 |
| JP | 05-012000 | 1/1993 |
| JP | 05-195859 | 8/1993 |
| JP | 08-161688 | 6/1996 |
| WO | WO 01/56285 | 8/2001 |

OTHER PUBLICATIONS

Paul C. Richardson, "CVAN: A Requirements Definition for a Real Time Local Area Network in Land Combat Vehicles", U.S. Army TARDEC, Warren, MI, 1998 IEEE.

Wolfson et al., entitled "Domino: Databases fOr MovINg Objects tracking," EECS Department, University of Illinois at Chicago, Army Research Laboratories, pp. 547-549.

Lappin, "Truckin': It isn't about weed, whites, and wine anymore. Not when you have information systems masquerading as freight lines, " 3.01 Wired Magazine (Jan. 1995).

*American Calcar, Inc. v American Honda Motor Co., Inc. and Honda of America Manufacturing, Inc.*, United States District Court, Southern District of California, Civil Action No. 06-CV-2433 DMS (LSP) (Exhibit 10, "American Honda's Preliminary Invalidity Contentions for U.S. Appl. No. 6,987,964" only) dated Nov. 30, 2006 (59 pgs.).

\* cited by examiner

*Primary Examiner*—William Trost
(74) *Attorney, Agent, or Firm*—Christie, Parker & Hale LLP (57) ABSTRACT

In an automobile, communications to and from the automobile are in the form of messages. Such messages are referred to as "electronic car-mail" or "C-mail" messages as each message has a destination or origination address which includes an identifier, e.g., a vehicle identification number (VIN), identifying the automobile. The messages may be delivered to the automobile from a remote server through a communications network, e.g., the Internet. One such message may contain a recall notice to the automobile. Another message may contain just-in-time map information for navigation, depending on the current location of the automobile. Yet another message may contain advertising information concerning selected entities, e.g., restaurants, gas stations, department stores, etc., also depending on the current location of the automobile. The messages transmitted from the automobile to the remote server may contain, e.g., GPS information identifying the location of the automobile, dynamic data furnished by sensors in the automobile for analysis, an odometer reading and a speedometer reading for records, etc.

32 Claims, 7 Drawing Sheets

| 303 | MAIL@CARCENTRAL.COM |
| 307 | JN1CA23D4TT567890@VEHICLE.COM |
| 311 | SELECTED DYNAMIC DATA |
| 315 | DATE AND TIME STAMP |
| 319 | ODOMETER READING |
| 323 | GPS DATA |
| 327 | DIRECTION DATA |
| 331 | SPEED DATA |

| | 509 ~ SAVE | DELETE ~ 511 |

FROM: ABC AUTO MANUFACTURER
<INFO@ABCAUTO.COM>

TO: 1998 X MAKE Y MODEL
<JN1CA23D4TT567890@VEHICLE.COM>

SUBJECT: RECALL NOTICE

DEAR VEHICLE USER:
ABC AUTO MANUFACTURER IS RECALLING 1998 X MAKE Y MODEL FOR POSSIBLE FAULTY AIR-BAG DEPLOYMENT MECHANISM. PLEASE ...

TECHNIQUE FOR COLLECTING DATA FROM VEHICLES FOR ANALYSIS THEREOF

CROSS-REFERENCE TO RELATED APPLICATIONS

The present application is a continuation of application Ser. No. 10/840,170 filed on May 5, 2004, now U.S. Pat. No. 6,987,964 which is a continuation of application Ser. No. 09/622,869 filed on Aug. 23, 2000, now U.S. Pat. No. 6,754,485, which is a National Stage of International Application No. PCT/US1999/028848 filed on Dec. 6, 1999, which was published under PCT Article 12(2) in English and which claims the benefit of (a) Provisional Application No. 60/113,397 filed on Dec. 23, 1998, and (b) Provisional Application No. 60/117,958 filed on Jan. 28, 1999; all of which are incorporated herein by reference.

FIELD OF THE INVENTION

The invention relates to a communications technique, and more particularly to a technique for communicating information, including advertising information, with automobiles.

BACKGROUND OF THE INVENTION

In this information age, virtually everyone is "connected" with one another via telephone, cellular phone, facsimile, pager, etc. In particular, because of recent major advancements in Internet technology, many people also utilize a personal computer (PC), notebook computer, handheld computer, etc., with a modem to communicate electronic mail (E-mail) with one another over the Internet. In addition, with common web browser software of the type of the NETSCAPE NAVIGATOR or MICROSOFT INTERNET EXPLORER browser installed in one such computer, a user is able to browse, on the computer, web pages from the world wide web (WWW), which is a graphical subnetwork of the Internet.

Many web pages, especially those providing free services such as search engines and other portal services, contain paid advertisements. Some web pages contain displayed options for providing directory assistance. One such option may be a "Yellow Page" option whereby a user may specify the desired product or service, and the area in which the user wants to obtain same. In return, the user is presented with information concerning each location of the provider of the desired product or service in the specified area.

To keep automobile users "wired" even while on the road, a PC specifically designed for them, namely, the "AutoPC," has been introduced. The AutoPC, which may be installed in the standard car stereo slot, comprises well known communications and navigation technologies. For example, the automobile users can utilize the AutoPC to communicate E-mail and pager messages. The users can also rely on the AutoPC to navigate with the aid of the U.S. government's constellation of global positioning system (GPS) satellites. In response to signals from such satellites, in a conventional manner, the AutoPC pinpoints the vehicle's location (in latitude and longitude). It also detects the vehicle's speed and direction. With geographic information stored therein, the AutoPC is capable of verbally and visually communicating to the user instructions for reaching the destination.

The marriage of communications and GPS technologies benefitting automobiles has been observed. The resulting service is known as the "OnStar service." This service requires that an OnStar system including a GPS receiver, and a cellular phone be installed in an automobile subscribing to the service. When an automobile user calls an OnStar service representative via the cellular phone, the system automatically communicates the vehicle's location tracked by the GPS receiver. The service representative may then provide the user with directions, restaurant recommendations, and/or roadside assistance depending on the vehicle's location.

In addition, to obtain diagnostic information from, and upgrade certain software in, an automobile, a system whereby an automobile communicates, with a remote station, data concerning the automobile is disclosed in U.S. Pat. No. 5,442,553 issued Aug. 15, 1995 to Parrillo. In the disclosed system, the remote station communicates the data via a cellular phone network to the automobile having a cellular phone connection, using the cellular phone number to locate the automobile.

SUMMARY OF THE INVENTION

We have recognized that the prior art system described above which uses the cellular phone number assigned to a cellular phone connection in a vehicle to locate the vehicle is disadvantageous. This stems from the fact that the cellular phone number appertains to, and is specifically associated with, the subscriber to the cellular phone service, who is most likely the current owner of the vehicle. As the cellular phone number is used for personal communications, when the ownership of the vehicle changes, the new owner would most likely replace the current cellular phone number with a new number for his/her own personal communications. As a result, the remote station in the prior art system can no longer locate and communicate with the vehicle using the old cellular phone number. Thus, the practicability of the prior art system turns on whether the system has a record of the latest phone numbers for locating vehicles. Even if procedures for registration of new phone numbers are in place, the workability of the system is undesirably subject to compliance by the new owners with the registration procedures.

In addition, utilizing the cellular phone network, the remote station in the prior art system when communicating data with multiple automobiles needs to call one automobile at a time. Thus, such a communication scheme is also ineffective especially when the remote station needs to transmit the same data, e.g., information concerning a recall of a certain type of automobile, to many automobiles. In that case, the remote station needs to make multiple calls to the respective vehicles to repeat the same data. Conversely, utilizing the cellular phone network, a vehicle can communicate with one remote station at a time. In the event that the same data from the vehicle needs to be communicated to various stations for different analyses, multiple calls need to be made to the respective stations one at a time, which is undesirable.

In accordance with an aspect of the invention, the communications between a vehicle and remote stations or servers are realized using electronic car-mail, referred to as "C-mail." Like a conventional E-mail message, a C-mail message is formatted in accordance with well known protocols, and it may be delivered by conventional mail servers on a communications network such as the Internet. However, unlike E-mail whose address identifies a person for personal communications and is analogous to the aforementioned cellular phone number, the C-mail has an address identifying the vehicle itself. For example, the C-mail address may be made up of the vehicle identification number (VIN) identifying the vehicle. Such a C-mail address remains unchanged at least over the lifetime of the vehicle. As the C-mail address appertains to, or specifically associated with, the vehicle, rather than a person, e.g., the owner of the vehicle, communications with the vehicle using C-mail is intact throughout the lifetime of the vehicle, surviving all changes in the ownership of the vehicle. In addition, by taking advantage of the well known E-mail features, the vehicle may multicast via C-mail the same information, e.g., diagnostic information, simultaneously to various servers on the Internet for different analyses. Conversely, a server may multicast via C-mail the same information, e.g., recall information, simultaneously to selected vehicles using the corresponding VINs as parts of their C-mail addresses.

In accordance with another aspect of the invention, a user may utilize a car browser to browse advertising information from a communications network, e.g., the Internet. The advertising information is provided in a just-in-time (JIT) fashion, whose content is dependent upon the current location of the vehicle indicated by GPS coordinates.

BRIEF DESCRIPTION OF THE DRAWING

Further objects, features and advantages of the invention will become apparent from the following detailed description taken in conjunction with the accompanying drawing showing an illustrative embodiment of the invention, in which.

DETAILED DESCRIPTION

Figure 1:
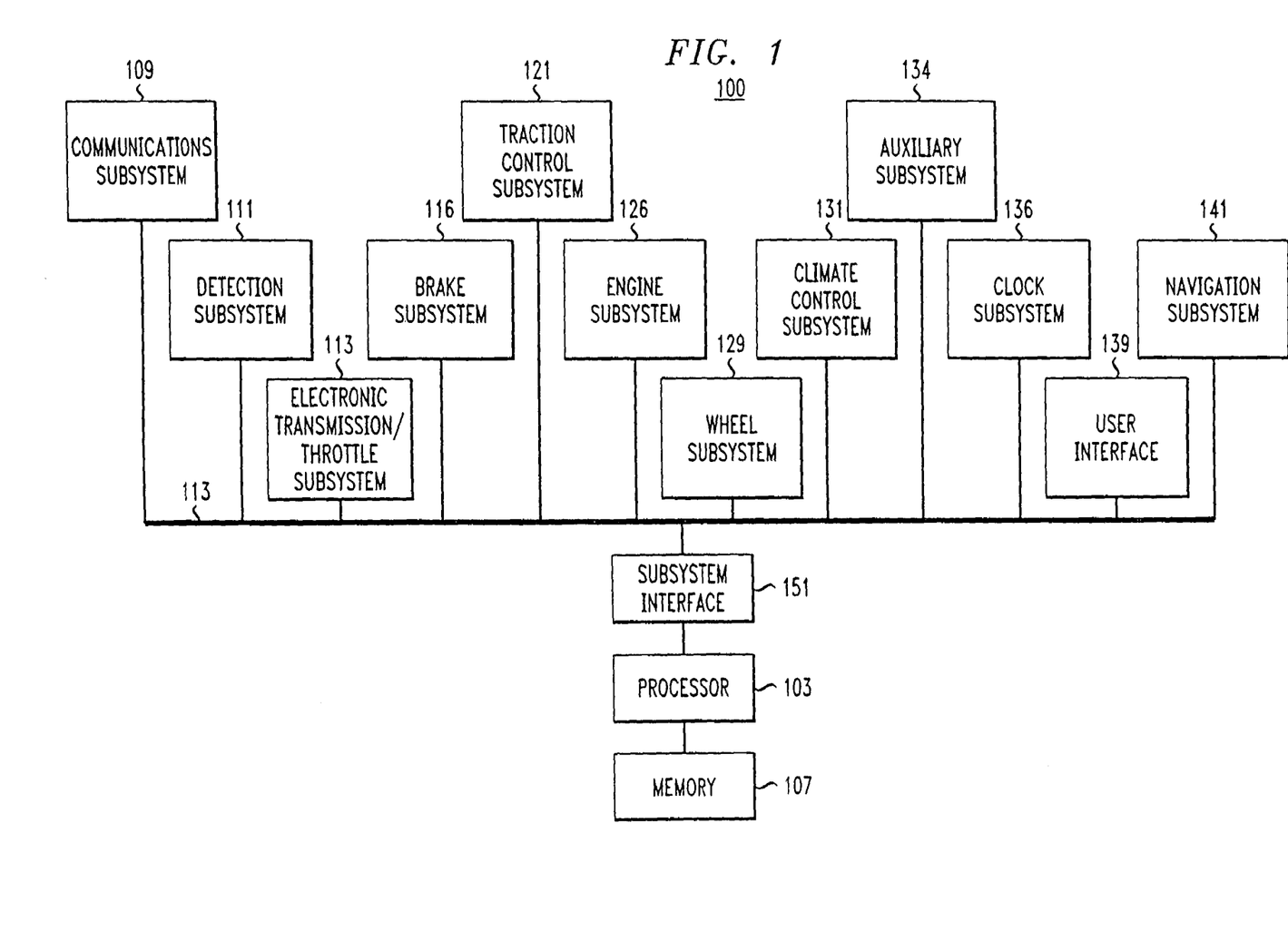
FIG. 1 is a block diagram of an information and control system for use in a vehicle in accordance with the invention.

FIG. 1 illustrates information and control system 100 embodying the principles of the invention for use in a vehicle, e.g., an automobile. In accordance with the invention, system 100 is capable of communicating information with remote servers through a communications network, e.g., the Internet in this instance. As to be described hereinbelow, system 100 may transmit information concerning the vehicle including, e.g., diagnostic information, GPS information, etc., to one or more servers, and receive therefrom information including, e.g., map information, weather information, traffic information, directory information, etc.

In a prior art system, a remote station communicates, with a vehicle having a cellular phone connection, data concerning the vehicle through a cellular phone network, using the cellular phone number assigned to the connection to locate the vehicle. However, such a communications scheme based on the knowledge of the cellular phone number is deficient in that the cellular phone number appertains to, and is specifically associated with, the subscriber to the cellular phone service, who is most likely the current owner of the vehicle. As the cellular phone number is used for personal communications, when the ownership of the vehicle changes, the new owner would most likely replace the current cellular phone number with a new number for his/her own personal communications. As a result, the remote station can no longer locate and communicate with the vehicle using the old cellular phone number. Thus, the practicability of the prior art system turns on whether the system has a record of the latest phone numbers for locating vehicles. Even if procedures for registration of new phone numbers are in place, the workability of the system is undesirably subject to compliance by the new owners with the registration procedures.

In addition, utilizing the cellular phone network, the remote station in the prior art system when communicating data with multiple automobiles needs to call one automobile at a time. Thus, such a communication scheme is also ineffective especially when the remote station needs to transmit the same data, e.g., information concerning a recall of a certain type of automobile, to many automobiles. In that case, the remote station needs to make multiple calls to the respective vehicles to repeat the same data. Conversely, utilizing the cellular phone network, a vehicle can communicate with one remote station at a time. In the event that the same data from the vehicle needs to be communicated to various stations for different analyses, multiple calls need to be made to the respective stations one at a time, which is undesirable.

In accordance with the invention, the communications between a vehicle and remote stations or servers are realized using electronic car-mail, hereinafter referred to as "C-mail." Like a conventional E-mail message, a C-mail message is formatted in accordance with well known protocols such as the well known mail transfer protocol and transmission control protocol/Internet protocol (TCP/IP), and it may be delivered by conventional mail servers on the Internet. However, unlike E-mail whose address identifies a person for personal communications and is analogous to the aforementioned cellular phone number, the C-mail has an address identifying the vehicle itself.

A typical E-mail address is in the format of <user-id>@<domain>, e.g., "jsmith@aol.com". As is well known, the <user-id> part before the "@" sign, e.g., "jsmith", identifies the E-mail user, e.g., Joe Smith. The <domain> part after the "@" sign, e.g., "aol.com", identifies the access mail server, e.g., an American Online server connected to the Internet, providing the E-mail service for Joe Smith in this instance. However, in accordance with the invention, a C-mail address is in the format of <vehicle-id>@<domain>. In this instance, the <vehicle-id> part consists of a vehicle identification number (VIN) which identifies the vehicle to which the C-mail address is assigned. In a conventional manner, the VIN uniquely identifies the vehicle by its make, model, year, etc. The <domain> part may represent a predetermined access mail server connected to the Internet for serving the C-mail needs of vehicles. For illustrative purposes, the <domain> part may be "vehicle.com" in this example.

Thus, the C-mail address of the vehicle in question here may be "JN1CA23D4TT567890@vehicle.com", where "JN1CA23D4TT567890" is the VIN of the vehicle. This C-mail address is stored in memory 107 in system 100, and remains unchanged at least over the lifetime of the vehicle. It should be noted that memory 107 here generically represents a combination of volatile, non-volatile and cache memories. As the C-mail address appertains to, or specifically associated with, the vehicle, rather than a person, e.g., the owner of the vehicle, communications with the vehicle using C-mail is intact throughout the lifetime of the vehicle, surviving all changes in the ownership of the vehicle. In addition, as described hereinbelow, by taking advantage of the well known E-mail features, the vehicle may multicast via C-mail the same information, e.g., diagnostic information, simultaneously to various servers on the Internet for different analyses. Conversely, a server may multicast via C-mail the same information, e.g., recall information, simultaneously to selected vehicles using the corresponding VINs as parts of their C-mail addresses.

Figure 2:
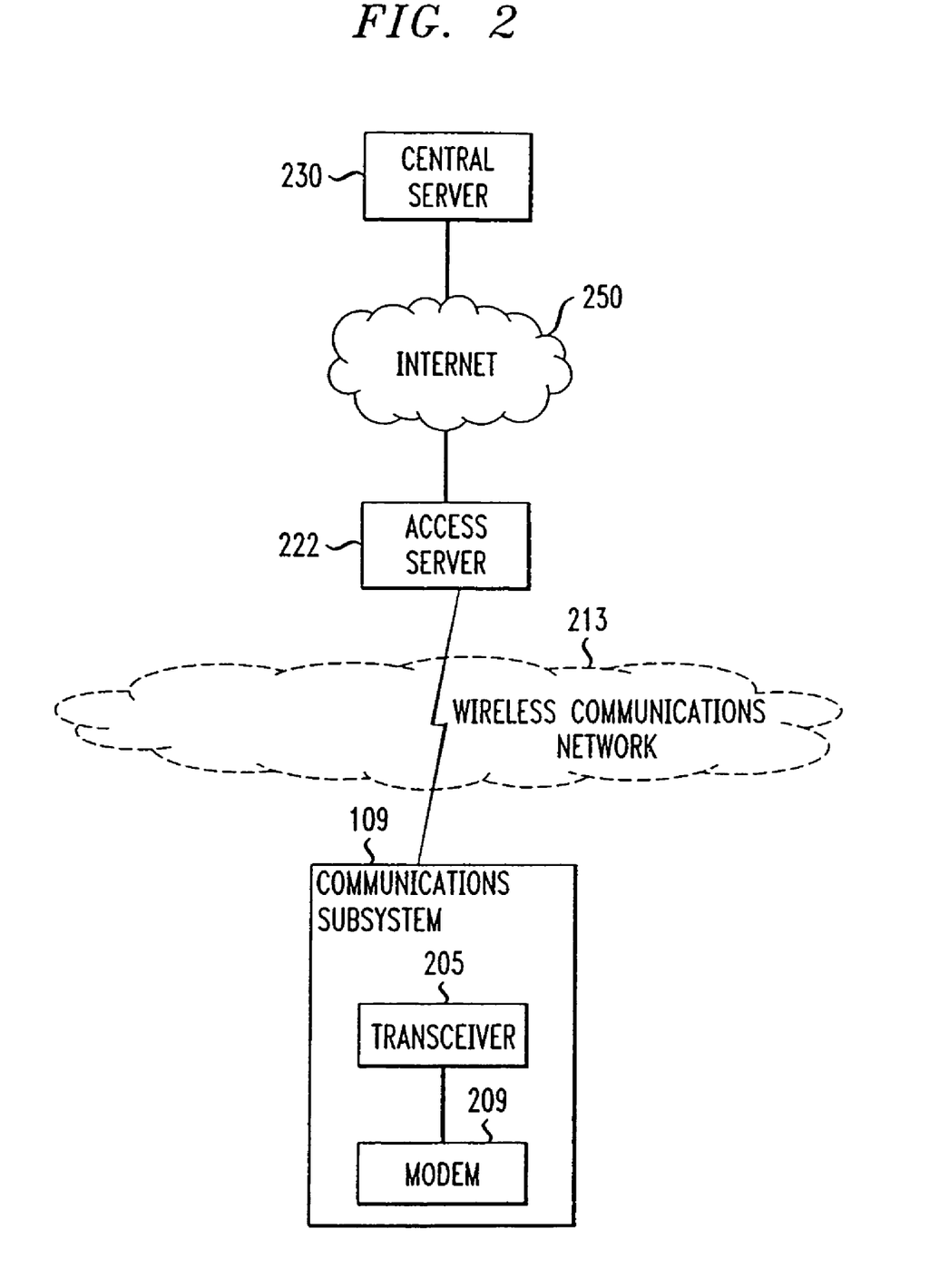
FIG. 2 illustrates an arrangement in which a communications subsystem in the system of FIG. 1 communicates with a remote server through a communications network.

System 100 includes communications subsystem 109 for communicating information, including C-mail, in the vehicle. FIG. 2 is a block diagram of subsystem 109 which comprises transceiver 205, which includes, e.g., a cellular phone, for transmitting and receiving information via wireless communications network 213, e.g., the well known advanced mobile phone service (AMPS) network, digital AMPS network, personal communications service (PCS) network, global system for mobile communications (GSM) network, paging network, hybrid personal communications network (HPCN), satellite network, microwave network, milliwave network, etc. Subsystem 109 also comprises modem 209 for modulating and demodulating carriers carrying C-mail data to and from data channels, e.g., cellular digital packet data (CDPD) channels, in wireless communications network 213.

Referring back to FIG. 1, subsystem 109 is connected via common bus 113 to other subsystems in system 100 including, e.g., detection subsystem 111, electronic transmission/throttle system 113, brake subsystem 116, traction control subsystem 121, engine subsystem 126, wheel subsystem 129, climate control subsystem 131, auxiliary subsystem 134, clock subsystem 136, user interface 139 and navigation subsystem 141. Subsystem interface 151 includes, e.g., an ensemble of standard inputs/outputs (I/O's) connecting processor 103 to all of the subsystems. Under control of processor 103, combinations of the subsystems synergistically carry out various vehicle functions.

For example, system 100 affords an adaptive cruise control function using detection subsystem 111, electronic transmission/throttle subsystem 113 and brake subsystem 116. Specifically, detection subsystem 111, which includes sonar, infrared transceiver, laser transceiver and/or Doppler radar, measures the distance to the vehicle just ahead. With electronic transmission/throttle subsystem 113 and brake subsystem 116, processor 103 adjusts the vehicle's speed to keep it moving with the traffic flow. If the vehicle ahead speeds up or slows down, subsystem 111 signals processor 103 to accordingly adjust the throttle or brakes to maintain a safe distance. Other automatic driving methodologies involving the above subsystems may be found in copending commonly assigned U.S. patent application Ser. No. 08/904,855 ("the '855 application"), entitled "Centralized Control and Management System for Automobiles," which however are deemed to be out of the scope of the present invention, and their description are thus omitted here.

Traction control subsystem 121, which may be of the type of the TRAXXAR stability control system, includes sensors for measuring the steering wheel position, yaw rate and lateral acceleration of the vehicle. These sensors work with processor 103 to controllably apply brakes at selected wheels to avoid potential skids.

Similarly, under the control of processor 103, engine subsystem 126 runs the engine of the vehicle at a selected R.P.M. using a selected fuel/air mixture to provide appropriate power for the vehicle.

Wheel subsystem 129 includes sensors for reading tire pressures, detection of loss of tire traction or tread, etc.

Climate control subsystem 131, which includes thermostats and an airflow controller, controllably cools or heats the vehicle compartment for the comfort of passengers, and the trunk/storage to properly preserve cargo; selects an air flow mode; sets fan speeds; enables or disables seat heaters; selects fresh or recirculated air; and enables or disables front and rear defrosters, mirror defrosters and steering wheel heaters.

Through auxiliary subsystem 134, processor 103 controls the functions of the doors, windows, hood, trunk, mirrors, air-bags, restraint devices, lights, etc., of the vehicle.

The above-described subsystems each include sensors (not shown) to provide a variety of dynamic data concerning the components associated therewith to processor 103. Specifically, sensors in communications subsystem 109 provides dynamic data concerning whether transceiver 205 and modem 209 are in proper order, which includes information concerning the level of battery power therefor.

Sensors in detection subsystem 111 provide dynamic data concerning whether the radars and transceivers associated therewith are functioning properly, which also includes information concerning the level of battery power for such radars and transceivers.

Sensors in electronic transmission/throttle subsystem 113 provide dynamic data concerning transmission or the status of the transmission, as well as the status of variables in the transmission including fluid levels, etc.

Sensors in brake subsystem 116 provide dynamic data concerning the wear of the brakes, status of the emergency brake and whether all of the brakes are in proper order.

The aforementioned sensors in traction control subsystem 121 provide dynamic data concerning measurements of the steering wheel position, yaw rate and lateral acceleration of the vehicle.

Sensors in engine subsystem 126 provide dynamic data concerning the engine R.P.M., fuel/air mixture, emissions, pollution content, remaining life of engine oil before the next requisite oil change, etc.

The aforementioned sensors in wheel subsystem 129 provide dynamic data concerning tire pressures, loss of tire traction or tread, etc.

Sensors in climate control subsystem 131 provide dynamic data concerning the temperatures of the compartment and trunk/storage, air flow mode, fan speeds, air quality inside the compartment, and statuses of the front and rear defrosters, mirror defrosters and steering wheel heater.

Sensors in auxiliary subsystem 134 which include, among others, the odometer and speedometer which provide dynamic data concerning the current mileage and speed of the vehicle, respectively. Other sensors in system 134 provide dynamic data concerning statuses of the doors, windows, hood, trunk, mirrors, air-bags, restraint devices, lights, etc., of the vehicle. In particular, some of the data concerns the integrity of the doors, windows, hood, trunk and mirrors, detection of any physical impact on any of them as happens in a collision, and whether or not the air-bags are ready to function or have been deployed, etc.

In addition, clock subsystem 136 provides processor 103 with data concerning the current time and date. Relying on such data, processor 103 duly synchronizes activities of system 100 and keeps track of events. Moreover, utilizing the temporal data, processor 103 realizes planner functions such as scheduling vehicle maintenance, etc.

It will be appreciated that the dynamic data provided by the above-described subsystems is only for illustrative purposes and, depending on the vehicle and the actual components incorporated therein, additional and/or other dynamic data may be desired. In any event, processor 103 polls each subsystem from time to time for the dynamic data and, based on the dynamic data, it may issue warnings, and messages describing irregularities through user interface 141 described below. Some irregularities may cause processor 103 to restrict certain vehicle operations until a corrective action therefor is taken. As described below, processor 103 causes selected ones of the dynamic data to be transmitted via C-mail to one or more remote servers for analyses and records.

Presently, in the United States, about 200 million vehicles operate on public roads. However, the operations of the vehicles are subject to federal and state laws. For instance, each operating vehicle needs to meet certain legal requirements concerning safety, emission, licensing, insurance, operational capabilities, etc. Thus, the law enforcement is interested in obtaining certain information about each vehicle to determine whether the operating vehicle meets such requirements.

In addition, many of the vehicles in the United States are leased or financed through financial institutions. The latter typically place liens on the vehicles with the right to repossess them in the event of non-payment of the underlying loans. Thus, such financial institutions are interested in knowing the whereabouts of the leased or financed vehicles in case of repossession thereof.

Further, auto repair services are interested in knowing the working history of each vehicle to be serviced for diagnostic purposes, and the maintenance history as to what and when previous services have been performed on, and parts have been replaced in, the vehicle. Similarly, potential buyers of a used vehicle may want to have independent records of the working and maintenance histories of the vehicle. In addition, they may want to know whether the vehicle was involved in a collision, whether its odometer reading is accurate, etc.

Still further, auto manufacturers and original equipment manufacturers (OEMs) are interested in obtaining data concerning components in each vehicle manufactured thereby to determine the durability of, and thus the appropriate warranties for, the components after the original sale of the vehicle. Independent watch groups are interested in such data as well for generating reports on vehicle quality for various vehicle brands.

In fact, all of the above data of interest may be provided via C-mail in accordance with the invention. Such data may be multicast by individual vehicles via C-mail to different servers on the Internet using the well known E-mail "carbon copy (cc:)" feature, whereby the destination addresses of the servers can be specified. Each server may be associated with a different entity and compile databases for use by that entity.

Alternatively, in this instance, the data is collected by central server 230 in FIG. 2 serving as a data warehouse, which can be queried to extract useful information. To that end, processor 103 composes a C-mail message concerning the vehicle in question, and is programmed to cause the C-mail message to be transmitted by communications subsystem 109 to a specified mailbox in central server 230 on Internet 250 from time to time, e.g., periodically. Accordingly, subsystem 109 establishes a dial-up connection through wireless communications network 213 to predetermined access server 222 which, among others, serve C-mail on Internet 250. It should be noted at this point that server 222 may not be the only one access server on the Internet serving C-mail. It will be appreciated that more access servers similar to server 222 are geographically distributed for effective communications of C-mail.

The C-mail message composed by processor 103 is transmitted through the established connection to server 222 where it is forwarded through Internet 250 to the central server mailbox, according to its address, e.g., mail@carcentral.com, where "carcentral.com" represents the domain associated with central server 230.

Figure 3:
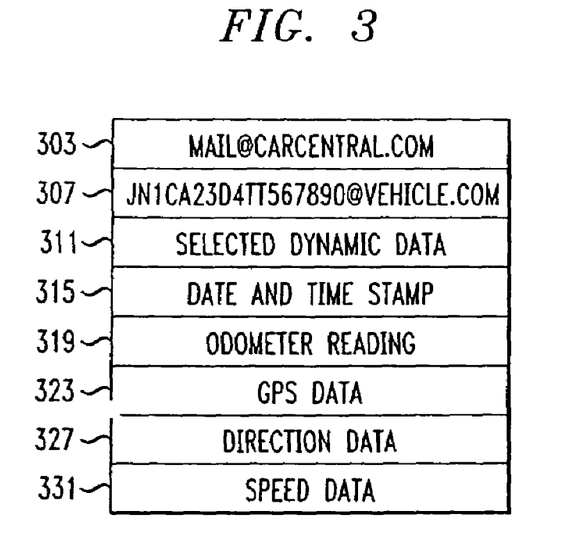
FIG. 3 illustrates data fields in an electronic car-mail message in accordance with the invention communicated by the communications subsystem.

FIG. 3 illustrates different data fields in the C-mail message as composed by processor 103. Specifically, data field 303 contains the address of the central server mailbox, i.e., mail@carcentral.com, to which the C-mail message is delivered. Such an address is stored in memory 107. Data field 307 contains the C-mail origination address associated with the vehicle in question, which is JN1CA23D4TT567890@vehicle.com in this instance as described before. Data field 311 contains selected ones of the dynamic data provided by the aforementioned subsystems in a predetermined format. Data field 315 contains the date and time stamp of the C-mail message which is provided by clock subsystem 136. Data field 319 contains the current odometer reading of the vehicle provided by auxiliary subsystem 134. Data field 323 contains GPS data provided by navigation subsystem 141 described below, indicating the current location of the vehicle. Data field 327 contains direction data from subsystem 141 concerning the current direction toward which the vehicle is heading. Data field 331 contains data concerning the current speed of the vehicle provided by the speedometer in subsystem 134.

Upon receipt of the C-mail message, central server 230 processes the data contained in the message, and distributes the data into appropriate databases to facilitate queries by different entities. Each new data entry to the databases is identified by the VIN of the vehicle which, as mentioned before, forms part of the C-mail origination address.

A first database in central server 230, which may be queried by law enforcement using queries in accordance with the standard relational database programming language SQL, may contain C-mail data from the respective vehicles concerning, e.g., their emission, pollution content, and integrity of lights, restraint devices, etc. For example, after querying the first database, the law enforcement may issue warnings or summonses to the owners of violating vehicles, or even prohibit use of such vehicles when the emission of the vehicles does not meet a certain standard, or when the safety of the vehicles calls into question because of a lack of integrity of their lights, restraint devices, etc. The law enforcement may issue such warnings or summonses via C-mail to the violating vehicles using the VINs, forming part of the C-mail addresses, in the responses to the queries.

In accordance with another aspect of the invention, the subject vehicle includes a security mechanism whereby the vehicle may be remotely disabled via C-mail in case of emergency, car theft, prohibition by law of use of the vehicle, etc. In accordance with such a mechanism, processor 103 checks each incoming C-mail message for a secret code for effecting disablement of the vehicle. If such a secret code is detected, processor 103 accordingly shuts the engine off, preferably when the speed of the vehicle is low to avoid an accident. The rest of the C-mail message may indicate the cause of disablement through user interface 139 described below. In a preferred embodiment, multiple secret codes are used to disable the vehicle, and a particular secret code is assigned to the law enforcement. In the event that the vehicle is disabled because of a violation of law, having so informed by the C-mail message, the vehicle owner needs to resolve the violation with the appropriate law enforcement authority before the vehicle engine is reactivated based on the particular secret code.

A second database in central server 230, which may be queried by financial institutions to track the leased and financed vehicles in case of repossession, may contain C-mail data from the respective vehicles concerning their GPS locations coupled with the dates, times, and heading directions and speeds corresponding to such locations. The knowledge of the whereabouts of each vehicle is also important when the vehicle needs to be located in case of an emergency or accident, especially when the user is incapacitated and unable to communicate the current vehicle location.

A third database in central server 230, which may be queried by auto repair services, OEMs and independent watch groups, may contain C-mail data from the respective vehicles concerning diagnostics of the working components in the vehicles provided by the above-described subsystems. An auto insurance company may also query the third database for data concerning, e.g., the speeds, and statuses of the brakes of a vehicle to assess the driving habit of the user. Based on the data which indicates the frequency of the vehicle's exceeding the highway speed limit, the rate at which its brakes wear out, etc., the insurance company determines certain risk factors associated with the user, and the insurance premium for his/her vehicle accordingly.

The auto repair services can also contribute to the third database after they furnish repair, maintenance and/or part replacements to each vehicle, thereby supplementing the database. To that end, each auto repair service sends an E-mail message to the central server mailbox describing the services rendered thereby to the vehicle. The data fields of such an E-mail message may include (a) the destination address field containing the address of the central server mailbox, i.e., mail@carcentral.com in this instance, (b) the subject matter or "re:" field containing the VIN of the vehicle just serviced, (c) the origination address field containing the E-mail address identifying the auto repair service, which in this instance has been registered with the central server, and (d) the message body field contains data concerning the services performed on the vehicle, any replacement of vehicle parts and descriptions thereof, and the date and time of the services, with an indication of whether any service or part replacement is in response to a recall notice by an auto manufacturer. The message body field may contain the data in a predetermined format, which may be in code to facilitate the data processing by central server 230 after receiving the E-mail message. Central server 230 distinguishes such an E-mail message from a C-mail message by the origination address identifying the repair service, which is registered and in a different format than a C-mail address. Upon receipt of the E-mail message from the repair service, central server 230 extracts the data from its message body field and incorporates the data into the third database under the VIN provided in the subject matter field.

Thus, among other things, by querying the supplemented third database, an auto manufacturer can obtain the VINs of those vehicles which responded to a recall notice issued thereby, which may have been sent via snail mail, e.g., the United States Postal Service, to the last known addresses of the vehicle owners of record as in prior art. The auto manufacturer typically maintains, on its own computer, a database of the VINs of the vehicles sold to which the recall notice applies. Thus, by entering the aforementioned VINs obtained from the supplemented third database, and by elimination, the auto manufacturer computer identifies the VINs of those vehicles which have not responded to the recall notice. In accordance with another aspect of the invention, the auto manufacturer computer may multicast a second recall notice via C-mail to those vehicles using the identified VINs as parts of the C-mail "cc:" addresses. Compared with the prior art snail mail approach whose practicability precariously depends on the validity of the record address of each vehicle owner who may have moved or changed, the inventive C-mail approach is much more effective where the recall notice in the form of C-mail is transmitted via the Internet to the vehicle itself, and the user in the vehicle is prompted by a user interface in a manner described below to read the C-mail recall notice as soon as it arrives. In fact, it is more economical and advantageous for the auto manufacturer to multicast the recall notice via C-mail to all of the vehicles concerned in the first instance.

As mentioned before, the third database supplemented by the auto repair services also catalogues the parts of each vehicle, which were replaced by such services, by their replacement dates and times, and descriptions. In the eventual scrappage of the vehicle, by querying the supplemented third database, the history of each replacement part therein is known. Depending on its history, the replacement part can be recycled, refurbished, or properly disposed to better protect the environment.

For used vehicle buyers, the supplemented third database may also provide C-mail data concerning any detection of a physical impact on the body of a vehicle, and any deployment of air-bags therein, indicative of a prior collision. In addition, it may include the odometer readings of the vehicle, coupled with the dates and times corresponding thereto. The odometer readings are assumed accurate if they increase with time.

It should be noted that to prevent fraud or tampering with the databases in central server 230, the data in the E-mail or C-mail to server 230 may be encrypted, or signed with a digital signature for authentication purposes, in accordance with a well known cryptographic algorithm, e.g., the RSA algorithm, digital signature algorithm (DSA), pretty good privacy (PGP) algorithm, etc.

It should also be noted that by using a conventional relational database manager (not shown) in server 230, each query against the databases therein results in a concise report satisfying the criteria specified in the query. In the event that any text, graphics, pictures, audio clips and/or video clips are attached to the C-mail or E-mail messages sent to server 230, such attachments are titled and tagged in the databases. The report generated in response to a query includes any relevant attachments.

Figure 4:
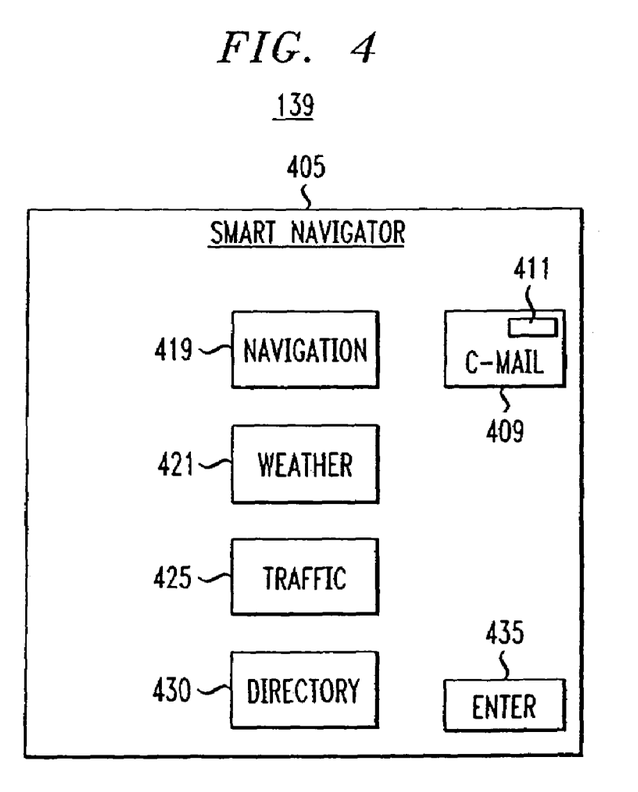
FIG. 4 illustrates a screen containing displayed options concerning navigation capabilities provided by a navigation subsystem in the system of FIG. 1.

Referring to FIGS. 1 and 4, user interface 139 includes display 405, e.g., a liquid crystal display (LCD), located on the dashboard of the vehicle, and a display driver (not shown), e.g., LCD driver, for processor 103 to control the display graphics on display 405. In this illustrative embodiment, interface 139 also incorporates well-known touch-screen circuitry (not shown). With this circuitry, the user can interact with processor 103 by, say, touching a displayed option on display 405. Through interface 139, processor 103 receives from the touch screen circuitry a signal identifying the location on display 405 where it has been touched. If such a location matches the predetermined location of one of the displayed options, processor 103 determines that the option has been selected. With such touch-screen and displayed option selection capabilities, the user is able to obtain information on and control selectable functions of the vehicle.

In this instance, interface 139 also includes (1) a conventional speech recognizer and audio input for the user to utter commands and responses to processor 103, and (2) a conventional speech synthesizer and audio output for processor 103 to communicate to the user in audio.

Of course, in addition to, or in lieu of, the above-described touch-screen capability incorporated in user interface 139, other well known user interface hardware/software may be incorporated therein for selecting displayed options on display 405. Such hardware/software includes, e.g., dedicated or programmable keys on the periphery of display 405; an indicator device such as a mouse, joystick, light pen, trackballs, touchpad, or a combination thereof; etc.

As disclosed in the aforementioned '855 application, processor 103 may cause different screens or pages to be displayed on display 405. Each page contains displayed options for controlling different aspects of the vehicle functions. For example, an audio page provides a choice of radio stations, a climate control page provides for temperature and vent adjustments, etc.

As mentioned before, a C-mail message containing data concerning current statuses of the subject vehicle is transmitted from subsystem 109 to server 222 on the Internet through an established connection from time to time. The frequency of such C-mail transmission may vary with the speed of the vehicle. For example, such transmission may be infrequent when the vehicle is stationary, i.e., at a zero speed, as not many vehicular activities are going on. After each transmission of the C-mail message from subsystem 109 to server 222, the latter in return transmits to subsystem 109 any C-mail messages from the Internet addressed to the vehicle through the same established connection before it is disconnected. As soon as any such C-mail message is received by subsystem 109, processor 103 reads the header of the C-mail message, which indicates whether the message contains display data for browsing and/or non-display data to be processed by processor 103. If processor 103 determines that the C-mail message contains display data, it causes a pop-up C-mail indicator to be displayed on the page that the user is currently on, indicating that a C-mail message has arrived. For example, one such C-mail indicator, denoted 409, appears on the SMART NAVIGATOR page of FIG. 4, which the user is currently on.

Figure 5:
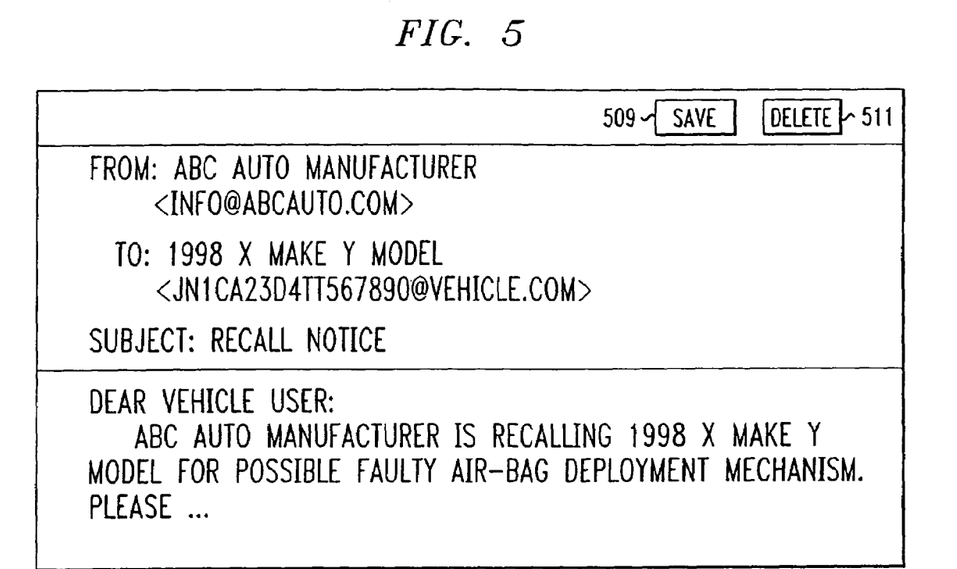
FIG. 5 illustrates a screen displaying an electronic car-mail message.

By touching in this instance the area of screen 405 where indicator 409 is displayed, exclusive of box 411, the user may open the C-mail message containing display data. FIG. 5 illustrates one such C-mail message which contains a recall notice. As shown in FIG. 5, the notice in this instance is from ABC Auto Manufacturer to the subject vehicle regarding a faulty air-bag deployment mechanism therein.

Under another circumstance, such a C-mail message may contain a warning or summons from the law enforcement, an auto insurance expiration notice from an insurance company, etc. After reading the C-mail message, the user has a choice to save the message in memory 107 using SAVE option 509, or delete same using DELETE option 511.

If upon seeing pop-up indicator 409, the user decides to read the C-mail message indicated thereby later, the user may touch the area of screen 405 corresponding to box 411 to minimize indicator 409 for postponing the opening of the C-mail message.

As shown in FIG. 4, the SMART NAVIGATOR page includes displayed options, e.g., NAVIGATION option 419, WEATHER option 421, TRAFFIC option 425 and DIRECTORY option 430. By selecting option 419 by touching same on display 405, followed by selecting ENTER key 435, the user is able to obtain navigation instructions to a given destination. Specifically, the user is elicited for information concerning the destination, any intermediate stops, etc. Such elicitation is realized by posing questions on display 405 and/or by uttering those questions using a synthesized voice through the aforementioned audio output. The user then provides verbal responses thereto through the aforementioned audio input. The speech recognizer in interface 139 then recognizes and registers the responses.

Navigation subsystem 141 in FIG. 1 receives signals from a constellation of satellites which is part of the U.S. government's GPS. In response to these signals, subsystem 141 pinpoints the vehicle's location in latitude and longitude. Using map information from sources described below, subsystem 141 provides on display 405 a suggested route leading to the destination specified by the user. Furthermore, based on the knowledge of the vehicle's instantaneous speeds and directions, subsystem 141 is capable of verbally and visually directing the user to such a destination.

For local navigation, the above map information may be provided from storage in the form of a compact disk (CD). However, because of the limited capacity of the storage, for navigation in remote areas outside the local coverage, subsystem 141 may obtain the necessary map information in real time via C-mail described above, or in the form of a web page in a manner described below. For example, as central server 230 receives C-mail messages from the vehicle from time to time, based on the GPS data in each message, indicating the current location of the vehicle, server 230 determines whether map information concerning remote areas is needed. This determination is based on a prediction as to where the vehicle may be during the interval between the receipt of the present C-mail message and that of the next C-mail message. Such a prediction is realized based on the length of such an interval, the data concerning the current speed and direction of the vehicle in the present C-mail message, etc. If it is determined that any remote area map information is needed, server 230 returns via C-mail to system 100 map information in a just-in-time (JIT) fashion which may be good for a predetermined radius from the current location of the vehicle. Alternatively, server 230 provides the map information affording a coverage based on the above-described prediction.

The user may select WEATHER option 421, TRAFFIC option 425, and/or DIRECTORY option 430 in addition to NAVIGATION option 419 on the SMART NAVIGATOR page. For example, when option 421 is selected in addition to option 419, followed by a selection of ENTER key 435, subsystem 141 provides on display 405 a suggested route to a given destination with indications indicating weather conditions, hazards, etc., along the route, as disclosed in the aforementioned '855 application. Similarly, when option 425 is selected in addition to option 419, followed by a selection of ENTER key 435, subsystem 141 provides on display 405 a suggested route to a given destination with indicators indicating traffic congestions, highway warnings, etc., along the route. When option 430 is selected in addition to option 419, followed by a selection of ENTER key 435, processor 103 causes a MAIN DIRECTORY page described below to be displayed on display 405. It suffices to know for now that after further selections by the user of additional options on such a page, a suggested route to a given destination with directory information concerning selected products and/or services, e.g., restaurants, gas stations, etc., along the route would be provided on display 405. It should be noted that the above weather information, traffic information and directory information may be aggregated along the same route.

In accordance with another aspect of the invention, the software for a car browser similar to the well known NETSCAPE NAVIGATOR or MICROSOFT INTERNET EXPLORER web browser is stored in memory 107 in system 100 for browsing information provided by servers connected to Internet 250. In particular, the car browser works compatibly with the standard hypertext transfer protocol (HTTP), hypertext markup language (HTML), virtual reality markup language (VRML), graphics interchange format (GIF), JAVA applets, etc.

For example, after selection of DIRECTORY option 430 alone or in combination with NAVIGATION option 419, followed by that of ENTER key 435 on the SMART NAVIGATOR page of FIG. 4, processor 103 causes communication subsystem 109 to establish a communication connection with access server 222. Processor 103 then causes the car browser, which is assigned an Internet protocol (IP) address in a conventional manner, to request directory information from a server identifiable by a predetermined uniform resource locator (URL). For example, the URL is "www.carcentral.com/directory" in this instance, which identifies the aforementioned MAIN DIRECTORY page provided by central server 230. Such a request by the car browser including the URL and an identity of the request originator, i.e., the car browser IP address, is sent via the established communication connection to access server 222, where the request in this instance is routed via Internet 250 to central server 230 based on the given URL.

Figure 6:
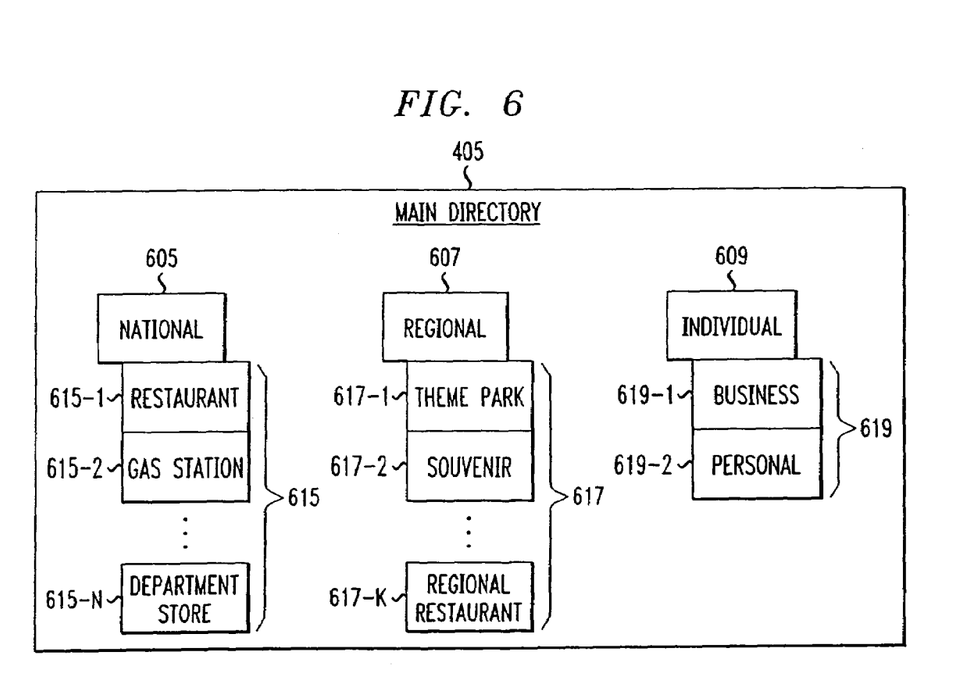
FIG. 6 illustrates a screen containing displayed options for accessing GPS based advertising information in accordance with the invention.

In response, server 230 returns a web page, namely, the MAIN DIRECTORY page, to the car browser according to its IP address provided in the request. Upon receipt of the MAIN DIRECTORY page, the car browser opens same on display 405. FIG. 6 illustrates one such MAIN DIRECTORY page on display 405.

As shown in FIG. 6, the MAIN DIRECTORY page includes NATIONAL option 605, REGIONAL option 607 and INDIVIDUAL option 609. For example, a selection of option 605 enables the user to access directory information concerning products and/or services of national recognition or brand obtainable within a selected distance of the current vehicle location. Specifically, upon detecting the selection of option 605, the car browser causes drop down menu 615, including RESTAURANT option 615-1, GAS STATION option 615-2, . . . and DEPARTMENT STORE option 615-N, to appear on display 405, where N represents an integer.

Figure 7:
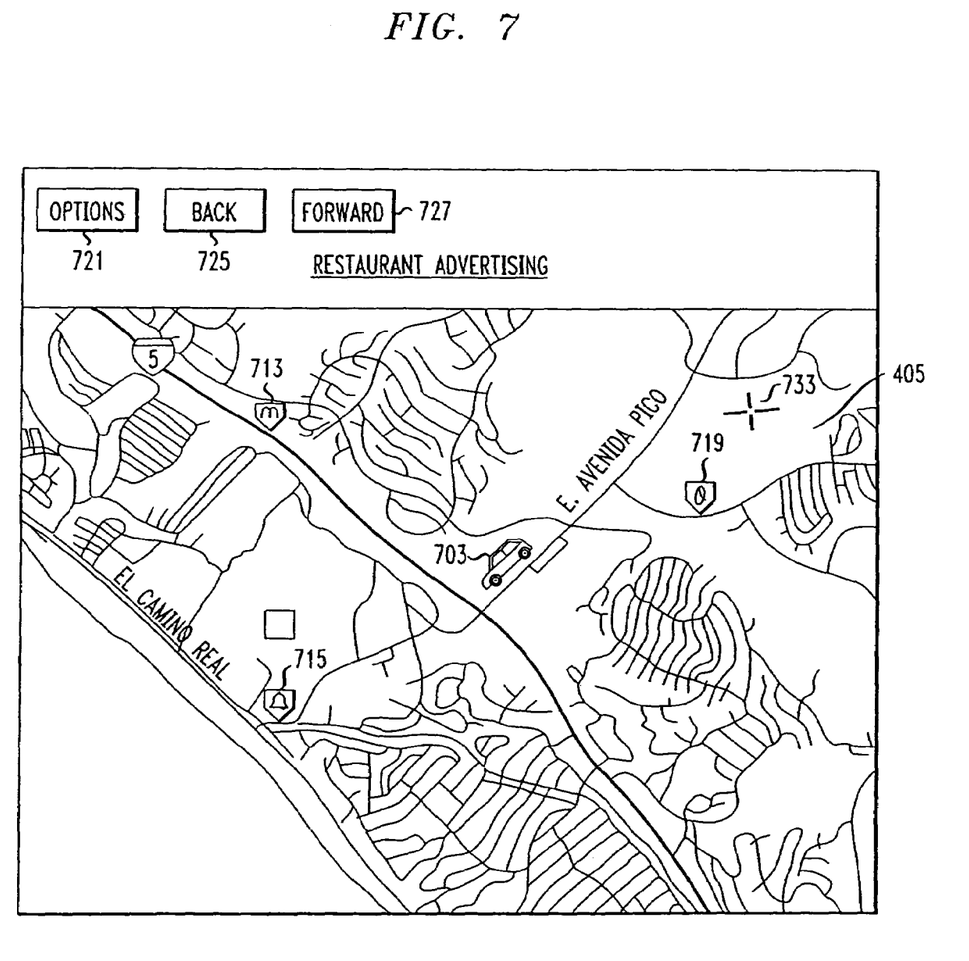
FIG. 7 illustrates a screen displaying an advertising page.

Without loss of generality, the user in this instance selects RESTAURANT option 615-1. Upon detecting such a selection, the car browser obtains the GPS coordinates of the current vehicle location from navigation subsystem 141, and then transmits a request for identities of nationally known restaurants within a selected distance, say, five miles, of the current vehicle location indicated by the GPS coordinates just obtained. In response, server 230 provides a RESTAURANT ADVERTISING page based on the received GPS coordinates. FIG. 7 illustrates one such RESTAURANT ADVERTISING page on display 405, with the assumption that DIRECTORY option 430 was selected alone, not in combination with NAVIGATION option 419 on the SMART NAVIGATOR page. Otherwise if the NAVIGATION option 419 was also selected, any navigation instructions for reaching a given destination would appear on the RESTAURANT ADVERTISING page as well.

As shown in FIG. 7, icon 703 indicates the vehicle location identified by the aforementioned GPS coordinates on a five-mile radius map. Tags 713, 715 and 719 respectively represent the nationally known restaurants on the map. For example, tag 713 indicates the location of McDonald's Restaurant; tag 715 indicates the location of a Taco Bell Restaurant; and tag 719 indicates the location of an Olive Garden Restaurant. Tags 713, 715 and 719 may incorporate the respective restaurants' famous logos for easy recognition. In any event, a selection of any of such tags, analogous to conventional hyperlinks, causes the car browser to access central server 230 for the identity of the corresponding restaurant in audio and in text. For example, after a selection of tag 713, based on the identity information from server 230, the car browser causes user interface 139 to announce, "Welcome to McDonald's," and/or play a jingle identifying McDonald's Restaurant, along with a display of textual words identifying McDonald's Restaurant next to tag 713.

It should be noted at this point that server 230 furnishes the directory information concerning product/service providers based on their paid advertising subscription. For example, for nationally known restaurants, server 230 only provides directory information about those restaurants which subscribe to its directory service. Server 230 stores in a memory therein the GPS coordinates of each subscriber restaurant. In providing the RESTAURANT ADVERTISING page of FIG. 7, server 230 identifies those subscriber restaurants (e.g., the restaurants represented by tags 713, 715 and 719 in this instance), which are within the selected distance of the vehicle location. Such a determination is based on a comparison between the GPS coordinates of the vehicle and those of each subscriber restaurant stored in the server memory.

OPTIONS key 721, BACK key 725 and FORWARD key 727 are also provided on the RESTAURANT ADVERTISING page of FIG. 7. For example, by selecting key 721, the user may re-define the coverage of the displayed map. Such re-definition may be achieved by selecting a further option for a new radius from the vehicle location, or by pointing and dragging cross mark 733 using an indicator device or using a finger if the user interface supports the touch-screen capability, which is the case here. When the user points at cross mark 733 and drags same away from the center of display 405, the coverage is enlarged and the displayed map is scaled up (i.e., with the number of miles per inch going up) accordingly. Conversely, when the user points at cross mark 733 and drags same towards the center of display 405, the coverage is reduced and the displayed map is scaled down (i.e., with the number of miles per inch going down) accordingly. By enlarging (or reducing) the coverage, the number of restaurant tags within the coverage most likely increases (or decreases).

By selecting key 721, the user may also specify the frequency of updating the RESTAURANT ADVERTISING page so that the user is informed of other restaurants on a continual basis as the vehicle is moving. Such a frequency may be defined in terms of time. However, in this preferred embodiment, the frequency is defined in terms of mileage, e.g., once every five miles from the current vehicle location. As soon as the frequency is specified, the car browser continually polls navigation subsystem 141 for the current GPS coordinates of the vehicle, and compares such coordinates with those in the previous request to central server 230. Once it is determined that the two sets of GPS coordinates are more than the specified distance (e.g., five miles) apart, the car browser issues a new request for identities of nationally known restaurants to server 230, which includes the current set of GPS coordinates of the vehicle. In response to the new request, server 230 provides a fresh RESTAURANT ADVERTISING page including any new restaurant tags on display 405.

In a conventional manner, the car browser records the sequence of pages that the user visited or browsed. Selection of BACK key 725 enables the user to revisit the page (e.g., the MAIN DIRECTORY page) immediately before the current page (e.g., the RESTAURANT ADVERTISING page). Similarly, selection of FORWARD key 727 enables the user revisit the page immediately following the current page. In this instance, FORWARD key 727 is non-selectable as the page following the RESTAURANT ADVERTISING page has not been established.

Figure 8:
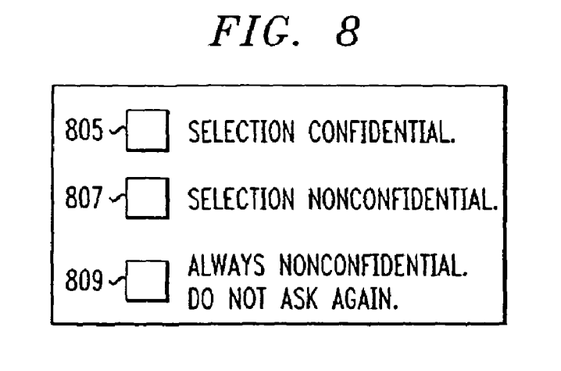
FIG. 8 illustrates a displayed window including inquiries as to confidentiality of accessing certain advertising information.

Continuing the above example, having learnt that tag 713 represents McDonald's Restaurant, the user may be interested in dining therein, and again selects tag 713 to obtain further information about the restaurant. Upon such a selection, the car browser opens an inquiry window on display 405. As illustrated in FIG. 8, the inquiry window includes three inquiries regarding the confidentiality of the user's selection. Specifically, if the user regards his/her selection confidential, the user may select box 805 to dispose of the inquiry window. On the other hand, if the user regards his/her selection non-confidential, the user may select box 807, instead. Furthermore, if the user regards his/her selection always non-confidential, and does not want to be bothered by the inquiry window in the future, the user may select box 809, instead.

After receiving, from the car browser, a request for further information about McDonald's Restaurant, and the user response to the confidentiality inquiry, server 230 first increments a hit count of tag 713, representing McDonald's Restaurant in question, by one. In general, server 230 keeps track of a cumulative number of hits of each tag representing a product/service provider-advertiser, the time and day of each hit, etc. The resulting statistics may be used by the provider-advertiser to measure the effectiveness of its directory subscription, and help formulate its promotional plans.

In addition, if the user response indicates that his/her selection of information about a product/service provider is non-confidential, server 230 stores such a selection, the time and day of the selection, etc., in a record identified by the IP address of the car browser representing the user. Any other selection by the user associated with such an IP address is stored in the same record. The resulting database, containing records from different users, may be utilized by the product/service providers to develop profiles of the consumers of their products/services. Taking advantage of the knowledge of the consumer profiles, the providers are able to design advertisements, commercials and promotional campaigns more targeted to their respective groups of consumers.

Figure 9:
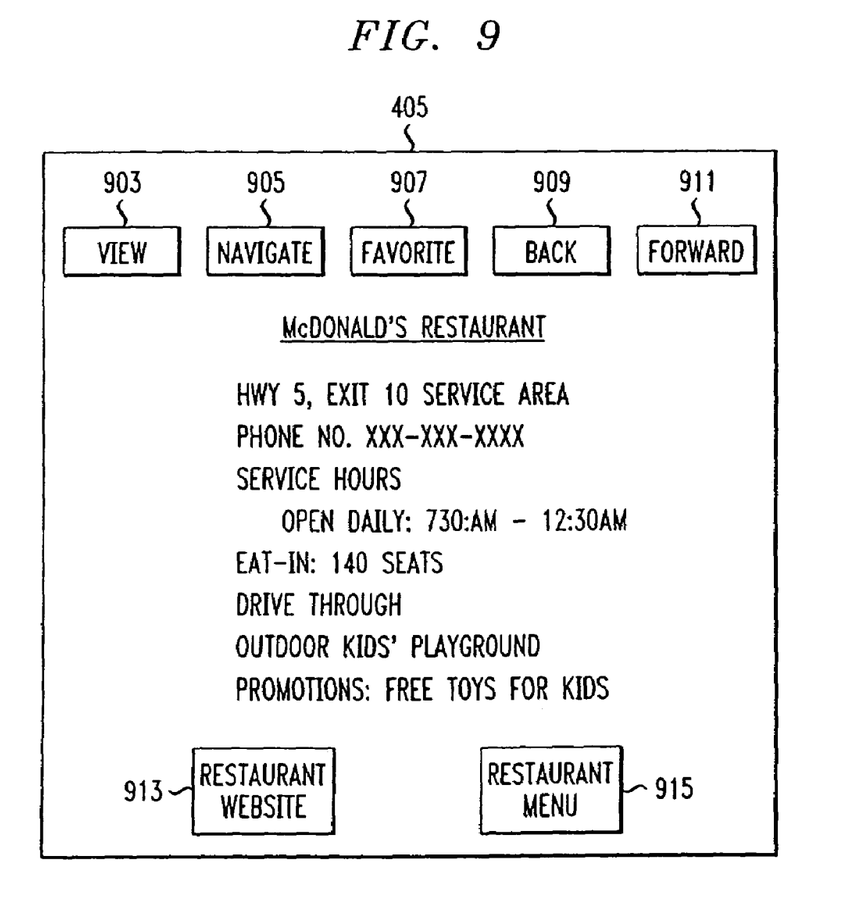
FIG. 9 illustrates a screen displaying information concerning a restaurant-advertiser.

Finally, server 230 returns a RESTAURANT page onto display 405. FIG. 9 illustrates the RESTAURANT page containing directions to McDonald's Restaurant represented by selected tag 703, and information concerning the restaurant service hours, phone number, facility, any promotion, etc. In an alternative embodiment, this page is preceded by a commercial about the restaurant based on a video and sound clip also provided by server 230.

In accordance with yet another aspect of the invention, server 230 collects digital images of subscribers' business operations and establishments. In this instance, one or more digital cameras are installed in each subscriber restaurant which periodically take pictures of the restaurant facility. The resulting images are formatted in conventional image files, e.g., GIF files, by an Internet processor in the restaurant. Illustratively, each image file includes in its header the GPS coordinates of the restaurant, and the time that the image was taken. The image time may also be embedded in the image itself. In a conventional manner, the image file is transmitted by the Internet processor via Internet 250 to server 230, where the image file is stored according to the GPS coordinates in the file header which identify the subscriber restaurant.

VIEW key 903, NAVIGATE key 905, FAVORITE key 907, BACK key 909, FORWARD key 911, RESTAURANT WEBSITE key 913 and RESTAURANT MENU key 915 are also provided on the RESTAURANT page of FIG. 9. A selection of key 903 causes server 230 to furnish, on display 405, one or more of the most recent digital images of McDonald's Restaurant in question which are identified by its GPS coordinates. Advantageously, by viewing the images, the user can determine whether the facility is desirable, and whether the restaurant would be crowded by the time the user arrives at the restaurant, taking into consideration a time stamp associated with each image.

A selection of NAVIGATE key 905 causes navigation subsystem 141 to provide the user with directions to the restaurant in a manner described before. A selection of FAVORITE key 907 enables the user to "bookmark" or register, in an individual registry described below, the GPS coordinates identifying the restaurant in question. It suffices to know for now that the individual registry includes a personal registry and a business registry. The user may bookmark the restaurant's GPS coordinates in a personal (business) registry if the restaurant is his/her favorite choice for personal (business) purposes.

BACK key 909 and FORWARD key 911 function similarly to above-described keys 725 and 727, respectively. Key 913 represents a hyperlink to the website of the restaurant. Thus, a selection of key 913 causes the car browser to open the restaurant website on display 405. In addition, a selection of key 915 enables the user to access the RESTAURANT MENU page, which is illustrated in FIG. 10.

Figure 10:
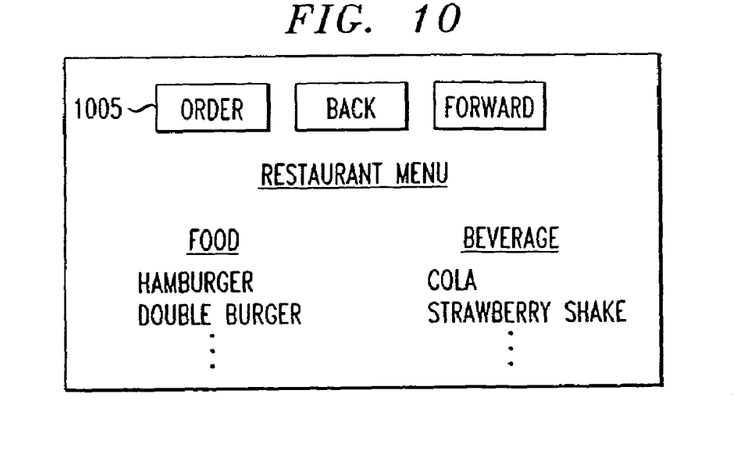
FIG. 10 illustrates a screen containing restaurant menu information.

As shown in FIG. 10, the RESTAURANT MENU page enumerates types of food and beverage served in the restaurant. Each food and beverage entry may be highlighted by selecting same. The user may order ahead the highlighted food and beverages by selecting ORDER key 1005. Upon selection of key 1005, the car browser causes the order information to be transmitted to server 230 which in turn transmits the information to the Internet processor in the restaurant for processing the order.

It should be noted at this point that the information concerning the selection of tag 713 representing McDonald's Restaurant, and any food and beverage ordered therefrom is stored in a specified memory space in memory 107 according to the GPS coordinates corresponding to tag 713. In the event that the car browser in the future receives, from server 230, tag 713 corresponding to the same GPS coordinates, the car browser retrieves from the specified memory space any stored information corresponding to such GPS coordinates. In the instant example, if the user returns via the same route or a route close thereto, tag 713 would most likely re-appear in the return trip. In that case, based on the stored information corresponding to the same GPS coordinates as tag 713, the car browser highlights tag 713 with a distinguishable color, indicating that the restaurant associated with tag 713 may have been visited. That is, tag 713 would be colored differently from other tags which were not selected. Such a distinguishable color highlight on tag 713 advantageously triggers the user's memory about the associated restaurant, and thereby helps him/her to decide whether or not to revisit the restaurant. In the event that the user decides to revisit a restaurant, and thus re-select the associated tag, when the user comes upon selectable items on the associated web pages which were previously selected, for example, those food and beverages on the RESTAURANT MENU page of FIG. 10 which were previously ordered, such items are also highlighted in a distinguishable color. Again, such a color highlight advantageously triggers the user's memory about the selected items, and thereby helps him/her to decide whether or not to re-select the same items.

Returning to the MAIN DIRECTORY page of FIG. 6, in this example, the user selects REGIONAL option 607, instead. In accordance with still another aspect of the invention, the REGIONAL option enables the user to access directory information concerning regional attractions, and products and/or services of regional recognition, i.e., which are particularly known in the region which the vehicle is currently in. Upon detecting such a selection, the car browser obtains the GPS coordinates of the current vehicle location from navigation subsystem 141, and transmits a request to server 230 for an appropriate drop down menu which is a function of the current vehicle location indicated by the GPS coordinates just obtained. Upon receipt of such a request, server 230 determines what region the vehicle is currently in based on the received GPS coordinates, and prescribes the appropriate menu containing options of products and/or services pertaining to the region as determined.

Continuing the example, assuming that it is determined that the vehicle is currently within a predetermined distance of Orlando, Fla., which is known for various theme parks and other tourist attractions. Accordingly, server 230 provides drop down menu 617 which includes, e.g., THEME PARK option 617-1, SOUVENIR option 617-2, . . . and REGIONAL RESTAURANT option 617-K, where K represents an integer. Similar to a selection of RESTAURANT option 615-1 described before, a selection of THEME PARK option 617-1 in this instance causes server 230 to provide a THEME PARK ADVERTISING page (not shown) on display 405. Based on the disclosure heretofore, it is apparent to a person skilled in the art that similar to the above-described RESTAURANT ADVERTISING page of FIG. 7, the THEME PARK ADVERTISING page would include a map having selected coverage, indicating thereon the current location of the vehicle and the locations of those theme parks which subscribe to the directory service by server 230. In addition, similar to the above-described RESTAURANT page of FIG. 9, any THEME PARK page (not shown) would include, e.g., directions to the theme park, information concerning visiting hours and promotions, an option for viewing digital images of the park facility, etc. Further, similar to the above-described RESTAURANT MENU page of FIG. 10, any ADMISSION TICKET page (not shown) would include, e.g., information concerning admission ticket prices and discounts, an option for ordering admission tickets ahead, etc.

A selection of INDIVIDUAL option 609 enables the user to access directory information concerning the user's favorite product/service providers according to the aforementioned individual registry. As mentioned before, the individual registry includes a business registry and a personal registry. Both the business registry and the personal registry are stored in an allotted memory space in memory 107. The business (personal) registry contains information concerning the user's favorite product/service providers for business (personal) purposes, and the corresponding sets of GPS coordinates identifying the location of such providers.

Specifically, upon selection of option 609, drop down menu 619, including BUSINESS option 619-1 and PERSONAL option 619-2, is provided on display 405. Without loss of generality, in this instance BUSINESS option 619-1 is further selected, the car browser then retrieves from the allotted memory space the stored business registry information and, based on the retrieved information, presents on display 405 a BUSINESS REGISTRY page, which is illustrated in FIG. 11.

Figure 11:
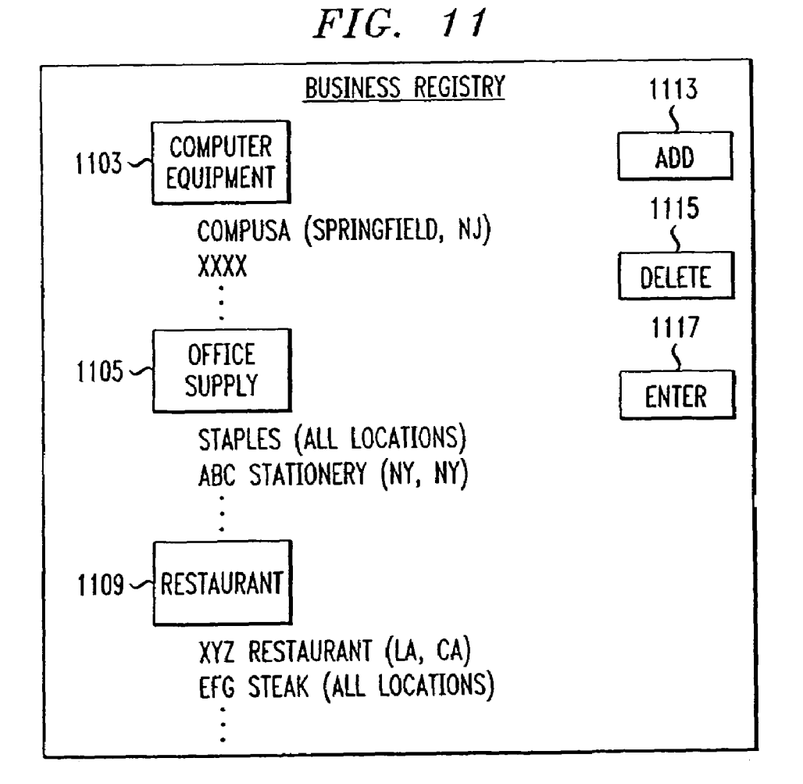
FIG. 11 illustrates a screen containing information concerning favorite product/service providers for business purposes.

As shown in FIG. 11, the user's favorite product/service provider pertaining to business are arranged under different category options such as COMPUTER EQUIPMENT option 1103, OFFICE SUPPLY option 1105, . . . and RESTAURANT option 1109. The user may add new favorite product/service providers to the registry by using the FAVORITE key, e.g., FAVORITE key 907, on a web page as described before. Alternatively, the user may utilize an ADD key on a registry page to achieve such addition. For example, upon selection of ADD key 1113 on the BUSINESS REGISTRY page, the car browser issues a request to server 230 for a directory menu containing the identity and GPS coordinates of each product/service provider subscribing to the directory service by server 230. After receiving such a menu, the user may select therefrom additional favorite product/service providers in any category. Accordingly, the BUSINESS REGISTRY page is revised, and the GPS coordinates of those selected providers are stored in the aforementioned allotted memory space, along with the identities of the additional providers.

DELETE key 1115 provides the inverse function to ADD key 1113 and allows the user to delete out-of-favor product/service providers from the registry page.

To access directory information concerning, say, office supplies according to the user's business registry, the user may select OFFICE SUPPLY option 1105 and then ENTER key 1117. In response, the car browser issues a request to server 230 for an OFFICE SUPPLY ADVERTISING page. Server 230 then returns onto display 405 the OFFICE SUPPLY ADVERTISING page (not shown). Similar to the RESTAURANT ADVERTISING page of FIG. 7, the OFFICE SUPPLY ADVERTISING page includes a map having selected coverage, indicating thereon the current location of the vehicle, and the locations of any of those favorite office supply providers. In the event that no favorite providers can be located within the coverage area, server 230 searches the aforementioned directory menu for substitute providers in that area which may be of the same chain or franchise, or which supply products/services of similar quality and price range to the favorite providers. However, the tags on the advertising page which represent the favorite providers are highlighted in a first predetermined color, and those representing the substitute providers are highlighted in a second predetermined color, thereby enabling the user to readily differentiate the favorite providers from the substitute providers.

In the event that the user's trip is multi-purpose, which involves obtaining different products/services in the same trip, the user may select multiple product/service provider options before selecting ENTER key 1117 to aggregate the directory information concerning providers of the different products/services on the same ADVERTISING page. For example, the user may select COMPUTER EQUIPMENT option 1103, in addition to OFFICE SUPPLY option 1105, before selecting ENTER key 1117. In that case, first and second sets of tags associated respectively with any computer equipment providers and office supply providers, as located, would be indicated on the ensuing ADVERTISING page. The tags in the first set differ from those in the second set by their shape, color or other feature to facilitate the user's selection of the corresponding providers.

Returning briefly to FIG. 6, a selection of PERSONAL key 619-2 instead of BUSINESS key 619-1 as in the above example occasions a process similar to that described above, which however involves product/service providers of the user's personal choice. In addition, an ENTER key may also be used on the MAIN DIRECTORY page to enable the user to aggregate, on the same ADVERTISING page, directory information concerning providers of different products/services under NATIONAL option 605 and/or REGIONAL option 607.

The foregoing merely illustrates the principles of the invention. It will thus be appreciated that those skilled in the art will be able to devise numerous other arrangements which embody the principles of the invention and are thus within its spirit and scope.

For example, system 100 is disclosed herein in a form in which various transmitter and receiver functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The invention claimed is:

1. A method for use in a system for collecting data from vehicles, comprising:
    receiving at least one data message from a vehicle over a communications network, the at least one data message from the vehicle being formatted to include at least a measure generated by a device in the vehicle, information for identifying the vehicle, and mileage of the vehicle;
    determining, from the information, a type of the vehicle; and
    providing at least selected data concerning the measure, and the mileage of the vehicle associated therewith for an analysis concerning the type of the vehicle.

2. The method of claim 1 wherein the measure is indicative of a condition of a battery in the vehicle.

3. The method of claim 1 wherein the measure is indicative of a condition of a tire of the vehicle.

4. The method of claim 1 wherein the measure is indicative of a condition of a brake of the vehicle.

5. The method of claim 1 wherein the measure is indicative of a condition of an air-bag in the vehicle.

6. The method of claim 1 wherein the measure is indicative of a condition of a restraint device in the vehicle.

7. The method of claim 1 wherein the measure is indicative of a condition of an engine of the vehicle.

8. The method of claim 1 wherein the device includes a sensor.

9. The method of claim 1 wherein the type of the vehicle includes at least a vehicle model.

10. The method of claim 1 wherein the type of the vehicle includes at least a vehicle year.

11. The method of claim 1 wherein the type of the vehicle includes at least a vehicle manufacturer.

12. The method of claim 1 wherein the information includes at least part of a vehicle identification number (VIN).

13. The method of claim 1 wherein the selected data is provided to an original equipment manufacturer (OEM).

14. The method of claim 13 wherein the analysis relates to a warranty of a vehicle component for the type of the vehicle.

15. The method of claim 1 wherein the mileage is provided by an odometer of the vehicle.

16. The method of claim 1 wherein the communications network includes at least part of the Internet.

17. A system for collecting data from vehicles, comprising:
    an interface for receiving at least one data message from a vehicle over a communications network, the at least one data message from the vehicle being formatted to include at least a measure generated by a device in the vehicle, information for identifying the vehicle, and mileage of the vehicle;
    a processing element configured for determining, from the information, a type of the vehicle; and
    a mechanism for providing at least selected data concerning the measure, and the mileage of the vehicle associated therewith for an analysis concerning the type of the vehicle.

18. The system of claim 17 wherein the measure is indicative of a condition of a battery in the vehicle.

19. The system of claim 17 wherein the measure is indicative of a condition of a tire of the vehicle.

20. The system of claim 17 wherein the measure is indicative of a condition of a brake of the vehicle.

21. The system of claim 17 wherein the measure is indicative of a condition of an air-bag in the vehicle.

22. The system of claim 17 wherein the measure is indicative of a condition of a restraint device in the vehicle.

23. The system of claim 17 wherein the measure is indicative of a condition of an engine of the vehicle.

24. The system of claim 17 wherein the device includes a sensor.

25. The system of claim 17 wherein the type of the vehicle includes at least a vehicle model.

26. The system of claim 17 wherein the type of the vehicle includes at least a vehicle year.

27. The system of claim 17 wherein the type of the vehicle includes at least a vehicle manufacturer.

28. The system of claim 17 wherein the information includes at least part of a VIN.

29. The system of claim 17 wherein the selected data is provided to an OEM.

30. The system of claim 29 wherein the analysis relates to a warranty of a vehicle component for the type of the vehicle.

31. The system of claim 17 wherein the mileage is provided by an odometer of the vehicle.

32. The system of claim 17 wherein the communications network includes at least part of the Internet.

* * * * *